US007320111B2

(12) United States Patent
Volovitz (10) Patent No.: US 7,320,111 B2
(45) Date of Patent: Jan. 15, 2008

(54) METHOD FOR ASSIGNING LARGE SETS OF CHARACTERS IN DIFFERENT MODES TO KEYS OF A NUMBER KEYPAD FOR LOW KEYPRESS-DATA-ENTRY RATIO

(76) Inventor: Oded Volovitz, Recanati #4, Tel Aviv (IL) 69494

( * ) Notice: Subject to any disclaimer, the term of this patent is extended or adjusted under 35 U.S.C. 154(b) by 569 days.

(21) Appl. No.: 11/000,843

(22) Filed: Dec. 1, 2004

(65) Prior Publication Data

US 2006/0123354 A1  Jun. 8, 2006

(51) Int. Cl.
*G06F 3/00* (2006.01)
(52) U.S. Cl. ...................................... 715/827
(58) Field of Classification Search ................ 715/827
See application file for complete search history.

(56) References Cited

U.S. PATENT DOCUMENTS

| 3,967,273 | A  | 6/1976  | Knowlton      |
| 4,008,793 | A  | 2/1977  | Terracina     |
| 5,793,312 | A  | 8/1998  | Tsubai        |
| 6,219,731 | B1 | 4/2001  | Gutowitz      |
| 6,320,942 | B1 | 11/2001 | Chang         |
| 6,348,878 | B1 | 2/2002  | Tsubai        |
| 6,356,258 | B1 | 3/2002  | Kato          |
| 6,611,255 | B2 | 8/2003  | Griffen et al. |
| 6,630,942 | B2 | 10/2003 | Chang et al.  |

(Continued)

FOREIGN PATENT DOCUMENTS

EP          0898222 A      2/1999

(Continued)

OTHER PUBLICATIONS

Kanellos, Michael, "FROGPAD Aims to Cut Keyboard Size," CNET News.com, Published on ZDNet News, Nov. 17, 2003.

(Continued)

*Primary Examiner*—Kristine Kincaid
*Assistant Examiner*—Le Nguyen (57) ABSTRACT

A key assignment method assigns large sets of alphabetic and other characters and functions to the keys of a standard numeric keypad for text/data entry on an electronic device. Two letters are assigned in pairs to each key of the standard 12-key keypad in a first character mode, and other symbols, characters, or infrequently used letters are assigned in a second or more optional character modes. A mode selection key is provided to select between the modes. In the first character mode, a keypress of a key selects the first letter of the pair and two keypresses in succession selects the second letter. The letter pairs may be assigned in alphabetic order, except for infrequently used letters, such as 'Q' and 'Z', or in QWERTY order, or in pairs of a more frequently-used letter with a less frequently-used letter. By comparison to the standard phone keypad layout having an average KPD=2.2, this method can achieve a KPD=1.4 or lower. The standard directional arrow keys (RDI keys) may be used for mode selection in multiple character modes. Using the RDI mode selector can transform the conventional 12-key telephone keypad into the equivalent of a 60-key data entry layout (or expandable by 48 more keys for each additional mode keystroke used), thereby allowing operation comparable to a full QWERTY keyboard of characters, with enhanced symbols and functions, and/or with multi-language character sets.

20 Claims, 7 Drawing Sheets

U.S. PATENT DOCUMENTS

| | | | |
|---|---|---|---|
| 6,822,585 | B1 | 11/2004 | Ni et al. |
| 6,847,706 | B2 | 1/2005 | Bozorgui-Nesbat |
| 6,885,317 | B1 | 4/2005 | Gutowitz |
| 2003/0048897 | A1 | 3/2003 | Luo |
| 2004/0104896 | A1* | 6/2004 | Suraqui ..................... 345/168 |

FOREIGN PATENT DOCUMENTS

| | | |
|---|---|---|
| WO | WO 02101531 A1 | 12/2002 |
| WO | 2004010674 A1 | 1/2004 |

OTHER PUBLICATIONS

"Research in Motion Introduces New Blackberry 7100v in Europe and Australia", Blackberry Press Release dated Sep. 16, 2004, printed from http://www.blackberry.com.

PCWORLD.COM, First Look: OQO Handheld PC Fails to Excite, http://www.pcworld.com/resource/printable/article/0,aid,118150,00.asp, Downloaded Jan. 27, 2005.

Mobile Phone News, Telus Mobility launches world's first Fastap wireless phone for fast texting, http://www.phonecontent.com/bm/news/gnews/628.shtml, Posted Nov. 30, 2004.

Bonnie Cha, Think Outside Stowaway Universal Bluetooth keyboard, http://reviews.cnet.com/4505-6460_16-31125478.html, Posted Oct. 5, 2004.

DYNAMIS.COM, Sony VGN-U50/70—Main. http://dynamism.com/u71/main.shtml, Downloaded Jan. 27, 2005.

Tegic Communications, T9 Text Input for Keypad Devices http://www.tegic.com/products/t9/, Downloaded Jan. 27, 2005.

CANESTA, Canesta, Inc. Products http://www.canesta.com/products.htm, Downloaded Jan. 27, 2005.

FROGPAD, Bluetooth FrogPad http://www.frogpad.com/information/bluefroginfo.asp, Downloaded Jan. 27, 2005.

BARGAINPDA.COM, New Sharp Zaurus SL-C3000 hits shelves in Japan—and Dynamism brings it to you http://www.bargainpda.com/default.asp?newsID=2314, Posted Nov. 25, 2004.

MOTOROLA, Motorola MPx http://www.motorola.com/motoinfo/product/detailsPf/0,,48,00.html, Downloaded Jan. 27, 2005.

T-MOBILE USA, T-Mobile Sidekick II http://www.t-mobile.com/prducts/overview.asp?phoneid=229040&class=pda, Downloaded Jan. 27, 2005.

DIRECTMOBILEPHONES.COM, The Handspring Treo 650—Smart Phones http://www.directmobilephones.com/handspring_treo650_index3.htm, Downloaded Jan. 27, 2005.

Fabrizia Pilato, Nokia 9300 Qwerty Communicator http://www.mobilemag.com/content/print.php?content=3182, Posted Sep. 8, 2004.

Sony Ericsson, Sony Ericsson announces the P910 smartphone—widest choice of input methods,added memory and ideal e-mail platform make the new P910 a must for mobile business professionals http://www.sony ericsson.com/spg.jsp?cc=global&Ic=en&ver=4001&template, Posted Sep. 15, 2004.

SIEMENS, SK65 Turning Communication Around http://communications.siemens.com/cds/frontdoor, Downloaded Jan. 27, 2005.

* cited by examiner

| ↕▬ | | |
|---|---|---|
| Screen ||||
| ג— | פ↑ <br> ז←ו—→ה <br> ש↓ | א— |
| ח— | | ד— |
| ל 1 | כ 2 | י 3 |
| ט 4 | ג 5 | מ 6 |
| צ 7 | פ 8 | ע 9 |
| ש * | ר 0 | ק # |

METHOD FOR ASSIGNING LARGE SETS OF CHARACTERS IN DIFFERENT MODES TO KEYS OF A NUMBER KEYPAD FOR LOW KEYPRESS-DATA-ENTRY RATIO

TECHNICAL FIELD

This invention generally relates to a method for assigning large sets of characters in different modes to the keys of a standard numeric keypad used in cellphones and other electronic devices for quick, reliable, and convenient text/data entry.

BACKGROUND OF INVENTION

Efficient methods of text entry are becoming increasingly important in today's mobile device market due to the continuous growth in use of SMS text messaging on mobile phones, the growing number of users that rely on Internet connection via cellphone to retrieve email on the go, the continued proliferation of mobile Internet connectivity devices, and the increasing portability of other types of text applications such as Chat, Instant Messaging (IM), Calendar, Address Book, Contacts, Word Processor, etc. Some devices have offered folding and/or plug-in keyboards that follow the standard Dvorak or, more commonly, the QWERTY keyboard layout familiar to users working on PCs, but these are awkward to carry or to use in mobile situations. If the keys are miniaturized to fit on the mobile device profile, the small individual keys become difficult to operate correctly and accurately. Each key requires its own footprint and switch, and the larger number of keys takes up valuable space on the device's printed circuit board and imposes commensurately greater tooling and assembly costs.

For many decades, there has been the long-used practice of imprinting the phone keypad's #2-#9 digit keys with 3 letters of the English (Latin) alphabet each (with a 4th letter from the infrequently used 'Q' and 'Z' characters added on two of the digit keys), so that a caller can "spell" a telephone number from a mnemonic word. With the advent of automated telephone exchange systems, it has become common to provide the function of automatic call routing by having the caller "spell" the name of the person being called using the keypad's digit keys corresponding to the letters of the name and predicting the correct name from a stored directory of names indexed to the various digit-key combinations. However, such predictive spelling systems often produce "false positives", i.e., they select alternative words spelled by the same keypress combination that are not the ones intended by the user, or they require the user to take additional steps to select or input the correct word from among the candidates returned.

The predictive spelling approach has been more broadly adapted for text entry on phone keypads using the T9™ predictive spelling system of Tegic Corp., Seattle, Wash., which employs a stored dictionary of words indexed to their respective 10-digit keypress combinations and predicts which word is intended by the user by ranking the words for selection based on frequency of use. A further adaptation of the predictive spelling approach has been recently developed by Research In Motion (RIM) Corp., Montreal, Canada, in its SureType™ keyboard system for its Blackberry™ wireless PDAs in which two extra columns of four keys each are added on each side of the three columns of the standard 12-key configuration, and up to 2 alphabetic letters or symbols are assigned to each of the 15 keys to resemble a standard QWERTY 26-letter keyboard. By assigning two letters per key combined with predictive spelling, the SureType™ system allows an expanded range of keypress combinations to be input to select the intended word correctly with less "false-positives". Other types of RIM keyboards have been devised with assignments of letter to keypad keys, e.g., as shown in PCT Published Patent Application WO02101531A1. However, these enhanced keypad layouts require additional tooling and assembly costs, and are still subject to the inaccuracies of predictive spelling.

Other systems have been developed to use the standard 12-key, 10-digit keypad to input text without using predictive spelling. In a commonly used multi-keypress keypad system, the user can select a letter to be input by pressing the digit key that has that letter in its imprinted set, then the user either pauses to allow the first letter in the set to be entered, or quickly enters one or more keypresses of the same digit key to select the second or subsequent letter in that set. A "mode" key, such as the "#" key, has also been used to switch between uppercase and lowercase letters and/or to symbol mode. However, the multi-keypress input method requires a relatively high number of keypresses per data entry (KPD), e.g., KPDs averaging 2.2 or more.

Another type of direct keypad entry system imprints up to 4 letters or symbols in radial directions around each digit key, and uses the 4-direction arrow keys or Radial Direction Indicator (RDI) cursor to select which letter or symbol is selected from the imprinted set. This system is more fully explained, for example, in U.S. Pat. No. 6,320,942 to Chang at el., assigned to KeyTouch Corp., Walnut, Calif. However, the KeyTouch RDI input system is not easy for the user to operate, since it requires a relatively high number of key presses per data entry (KPD), e.g., KPDs averaging 2 or more, and since it requires discerning which of the small imprinted characters or symbols are imprinted in which radial position, then selecting the corresponding RDI arrow key. Other attempts to provide for text entry on small mobile devices include voice recognition and stylus entry from an LCD display of either hand written text or of soft keys of a keyboard layout, but these have not operated reliably enough, are usually costly solutions, and/or are inconvenient to operate in mobile situations.

SUMMARY OF INVENTION

It is therefore a principal object of the present invention to provide for text or data entry on mobile devices in a manner that is reliable, accurate, easy to operate, and convenient to carry and use in mobile environments. It is a specific object of the invention, to provide a text/data entry method which employs the standard 12-key, 10-digit keypad commonly used on cellphones and other electronic devices, but does not require the space or structure of a full QWERTY or Dvorak keyboard layout, is not subject to the inaccuracies and "false positives" of predictive spelling systems (or subject to less inaccuracies if it does makes use of these methods), and can offer a keypress-to-data-entry ratio that is substantially lower than the multi-keypress input method.

In accordance with the present invention, there is provided a method for assigning large sets of characters in different modes to the keys of a standard numeric keypad for text/data entry on a character-input device comprising:

(a) associating each key of the numeric keypad with a first non-numeric character mode and one or more other, optional character modes, wherein the first character mode associated with the key includes a pair of characters of a standard alphabetic character set, and wherein the other, optional character modes associated with the key includes at least another non-numeric character;

(b) providing a mode selection key with the numeric keypad for selecting between the first character mode and the other optional character modes; and (c) enabling text/data entry of alphabetic and other characters via the numeric keypad by interpreting a keypress of the mode selection key to select one of the character modes, and interpreting a keypress of a key of the numeric keypad in the first character mode as selecting the first character of the pair and two keypresses in succession as selecting the second character of the pair for that key, whereby the numeric keypad is enabled for text/data entry accommodating the alphabetic characters of a standard alphabetic character set as well as other characters with an average keypress-per-data-entry (KPD) ratio of less than 2.0.

In a preferred embodiment, the key assignment method involves associating (imprinting) each key of the standard 12-key numeric keypad with two letters of the English alphabet for the first character mode, with the letters assigned in pairs in alphabetic order excepting the infrequently used 'Q' and 'Z' letters, and with one or two symbols or the infrequently used letters 'Q' and 'Z' for another optional character mode. The other optional character modes can include an Uppercase mode and/or a secondary language mode. In comparison to the current standard phone keypad layout and multi-keypress input method having an average KPD=2.2, the preferred embodiment of the invention can achieve a KPD=1.4, which is a significant improvement that makes text input much quicker and easier.

The mode selection key may be programmed to be any of the other functional keys provided with a phone or other mobile device, such as the typical "Talk/Send", "Clear", or "End/Done" keys. If the device has 4-direction arrow keys (RDI keys) along with a "Central" or "Inward" direction or key, they may be used for mode selection of up to 5 character modes in one keypress. The five modes can be graphically mapped on the keys of the keypad and/or on the display screen to provide a visual cue for the user to select the corresponding directional arrow. Using the RDI mode selector can transform the conventional 12-key telephone keypad into the equivalent of a 60-key data entry layout (or expandable by 48 more keys for each additional mode keystroke used).

In another version, the letters may be distributed in pairs by positioning highly frequent letters in the first character location of each of the 12 keys, so that only one keypress is needed to select these frequent characters. This would decreases the average KPD=1.2. While keeping the standard alphabetical order may be easier for users, the invention is not limited to any particular ordering of letters and any other combination is possible.

Since the invention greatly expands the number of characters that can be accommodated, other symbols for enhanced text or data functions, such as Edit, Copy, Cut, Paste, etc., by adding these functions to a 'Sign Mode' or other modes. Multiple language character sets can also be accommodated in a secondary language character mode.

The invention can reduce by 40% the expected average number of keystrokes and approximately in half the amount of time required to enter data onto phone style keypads. In most cases, it enables users to type any character (within a certain mode) in usually one or at most two keystrokes. It also enables switching from one mode to another in one or at most two keystrokes. The use of mode selection greatly expands the available characters that can be accommodated by the 12-key keypad, thereby allowing sophisticated text and data entry easily. By featuring all the above, the invention frees mobile users from the constraints of entering data in small form factor keypads and can provide as much functionality as a full (or almost full) QWERTY keyboard.

The key assignment method of the present invention (sometimes referred to herein as "Qtype") preferably utilizes the standard 12-key keypad configuration, and therefore can be readily adapted to new mobile devices with keys imprinted or overlaid with the chosen character layout. In addition, it can be readily retrofitted in existing devices as a software download operable with the device operating system. The keys of retrofitted devices can be overlaid with new imprinted key covers or labels or by exchanging the whole device panel, or the new character layout can also be displayed as a whole on the device display or displayed only for the characters of an individual key for verification with each keypress.

Other objects, features, and advantages of the present invention will be explained in the following detailed description of the invention having reference to the appended drawings.

DETAILED DESCRIPTION OF INVENTION

Figure 1A:
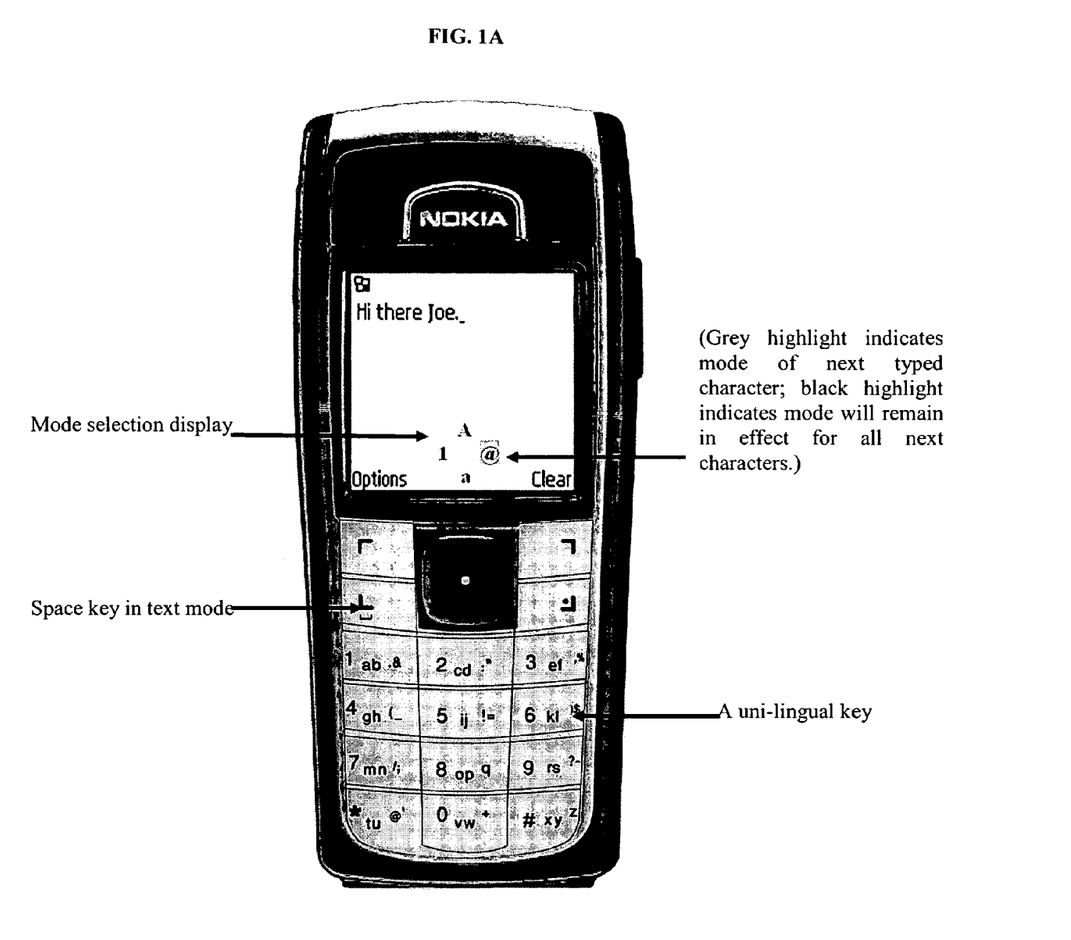
FIG. 1A shows one embodiment of the invention assigning 24 of the more frequently used letters of the 26-letter English alphabet in the alphabetic character mode along with a sign mode.

Referring to FIG. 1A, an embodiment of the invention is shown assigning 24 of the more frequently used letters of the 26-letter English alphabet to the 12 keys of a standard numeric keypad in a first non-numeric character mode (referred to herein as "Letter" mode), and other characters, including symbols, functions, punctuations and/or the less frequently used letters of the alphabet, to one or more other, optional character modes (the one here referred to as "Sign" mode). Each key of the 12-key numeric keypad is associated (imprinted) with two letters of the English alphabet for the first (Letter) character mode and one or more signs for a second (Sign) character mode. In the first character mode, 24 letters are assigned in pairs in alphabetic order except for two infrequently used letters, such as the 'Q' and 'Z' letters. The second character mode (imprinted on the right part of each key) has one or two signs on each key and, on two, the infrequently used 'Q' and 'Z' letters.

In this example, the means for switching between character modes is the four-way RDI arrows commonly provided with enhanced digital cellphones or other mobile devices and used to point as a cursor in the four quadrant directions (Up, Right, Down, and Left), and here they are used to select between Uppercase, Sign, Lowercase, and Number character modes. The four modes are also displayed on the LCD display screen (upper rectangle in the figure) to provide a visual cue for the user to select the corresponding directional arrow. The mode highlighted in grey is that of the next typed character. Had the mode been highlighted in black it would have meant that this mode would stay effective as long as there is no change of modes. The displayed Uppercase and Lowercase character modes correspond to two modes of the first (Letter) character mode on each key, while the displayed Signs correspond to a second, optional character mode for each key. Using the 4-direction RDI keys as well as the "Inward" or "Central" RDI key, the 12-key telephone keypad can select among 5 modes, and accommodate the equivalent of a standard 60-key data entry layout (expandable by 48 more keys for each additional mode keystroke used).

Each key of the 12-key keypad is thus associated with a first character mode including two more frequently-used alphabetic characters of a standard alphabetic character set, and at least a second, optional character mode including other sign characters and the less frequently-used alphabetic characters of the standard alphabetic character set. The first character mode can thus accommodate up to 24 frequently-used alphabetic characters, and the second character mode can accommodate at least 12 and up to 24 signs and less frequently-used alphabetic characters. The RDI arrows allow for mode selection between four different character modes for each key. The RDI "Central" key can be used to signal that the user wants mode selection using one of the four RDI arrows and/or to switch between modes. In the first (Letter) character mode, each keypress of a numeric key of the 12-key keypad selects the first letter of the alphabetic letter pair on the key, and two keypresses in quick succession selects the second letter of the pair. A keypress of a new key selects the first letter of the pair assigned to the new key.

Figure 1B:
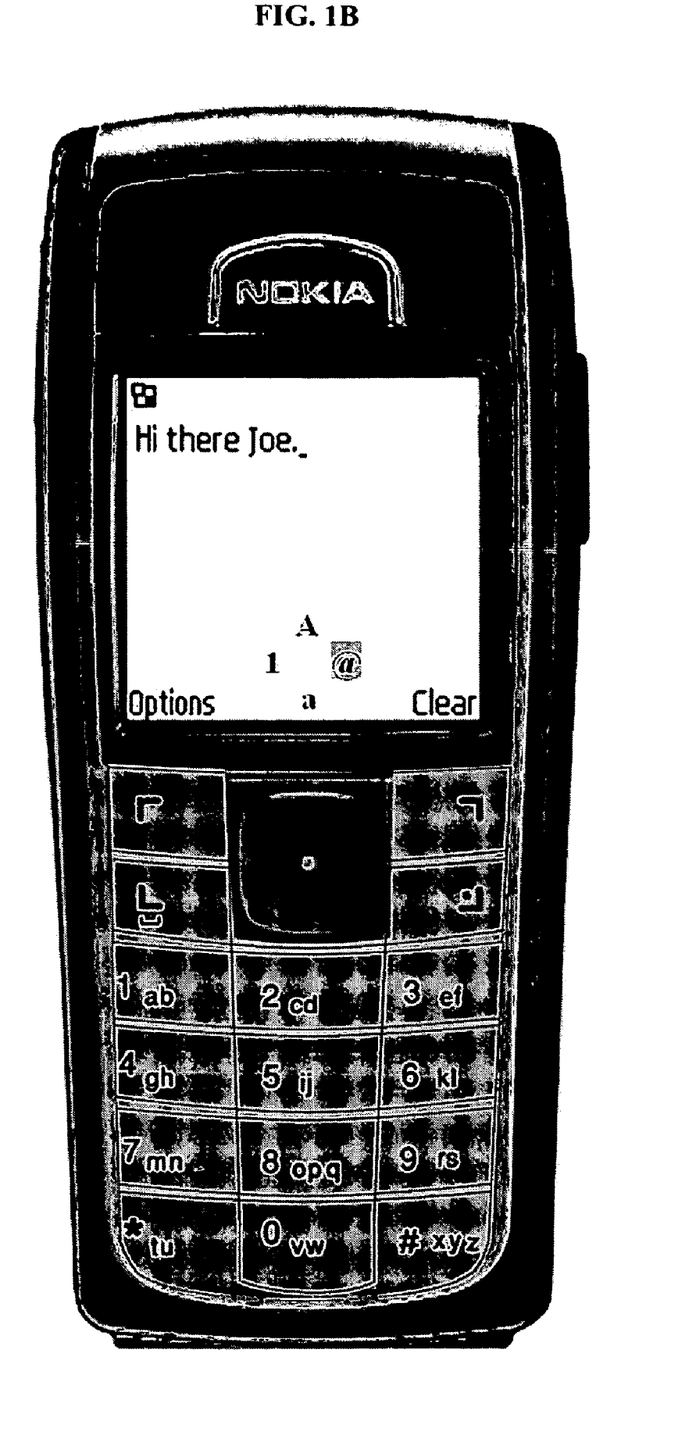
FIG. 1B shows another embodiment assigning all 26 letters to the 12 keys.

As another example, FIG. 1B shows a key assignment scheme in which all 26 letters of the English alphabet are assigned to the 12 keys of the numeric keypad in the first character mode (two keys have 3 characters and the 3$^{rd}$, infrequently-used character will require 3 keypresses), and only other sign characters are assigned in the second or more other character mode(s).

A summary of the different keystroke functions in the above described versions is provided as follows:

Space='OK' (the bottom left function key)

Backspace (delete)=Top right key And/Or the dedicated 'Clear' key And/Or a short keystroke of the 'END' key.

Exit=Long 'END' (the bottom right key)

Single Number=long keystroke of the desirable character key

Switch between the modes #1='RDI' followed by the appropriate arrow key related to a certain mode (⇧ AB ⇩ab ⇨signs ⇦secondary-language/number). Alternatively, the first keystroke of an arrow key will cause a temporary (only for the next character) change in modes, while the second keystroke will provide a full change in mode.

Switch between the modes #2='RDI' until the desirable mode is reached (e.g. 'ab' mode will change to '@b' followed by the other modes, similarly to the current shift mode key) ('@b'=the first keystroke will provide a sign character afterwards the system will go back automatically to its original mode, in this case 'ab' mode).

Switch between the different options='Options' (such as the top left key in Nokia phones) and afterwards the arrow keys And/Or striking several times the 'Options' key.

Select a certain option=after the 'Options' key was pressed, and the desired option was found, press the 'RDI' And/Or press the desirable option number.

Send='Options' and afterwards a selection key And/Or long 'OK' keystroke.

Predictive text mode=(Only for users that wish to use it) turning on and off the predictive text system, could be down either through the Options menu or instead of the secondary-language mode, if not in use.

Figure 2:
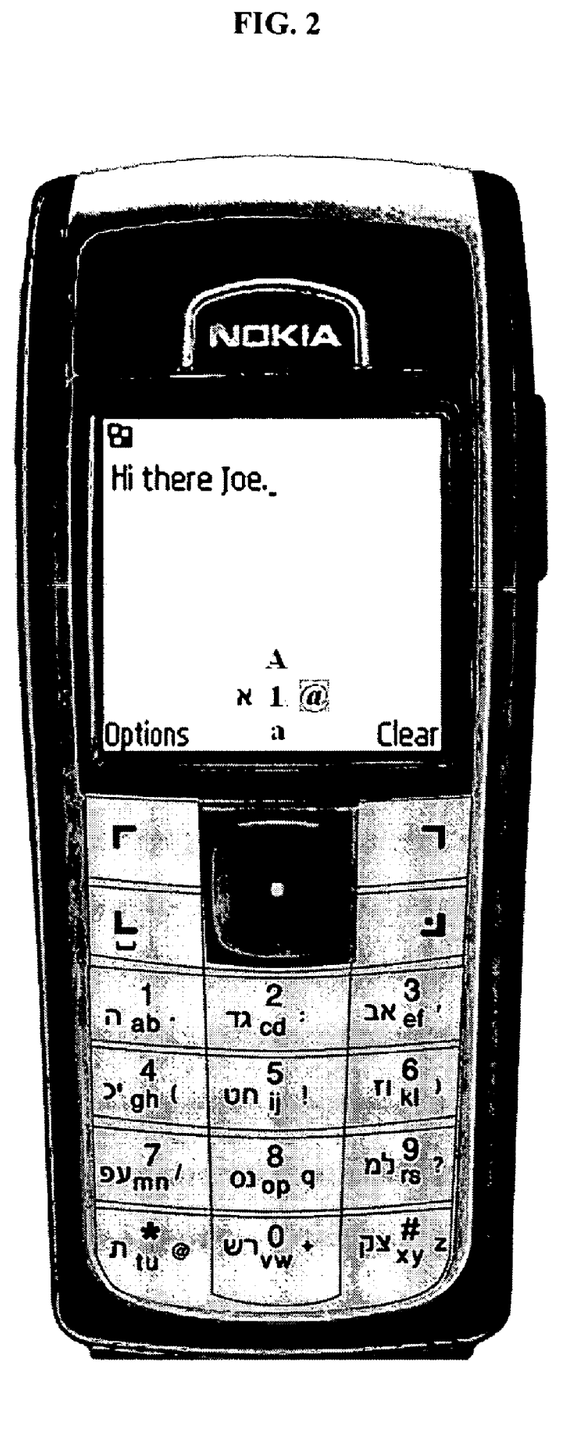
FIG. 2 shows another embodiment employing multiple language character sets.

In FIG. 2, another keypad layout according to the invention is shown. This layout includes: two (Uppercase and Lowercase) English alphabet modes, a Hebrew alphabet mode and a "Sign" mode. Besides the numeric digit (selected by holding a long keypress), each key is mapped with paired symbols in three other character modes, i.e., English letters, Hebrew letters, and Signs. When the "Central" RDI key is pressed, four character modes (English Uppercase, Signs, English Lowercase, Hebrew) can be displayed on the LCD screen display in the corresponding directional positions for selection with an RDI arrow key. This version allows a cellphone or other electronic device to be used for bilingual text/data entry.

Below are the different keystroke needed for data entry. "Single" character refers to typing a character from a non-current mode so that after that character is typed, the mode will change back automatically to the previous mode.

The first Latin letter in the letter key-group ('a') strike the #1 key.

The second letter ('b') strike the #1 key twice.

The single numeral ('1') long keystroke of the #1 key.

The single cap ('A') either change to capital letters mode as described above and strike the #1 key. Or: strike the #1 key and right after that the upper key. Note that this method has already been used in Motorola 835 and other phones and could be similarly used for typing single characters from all other modes (e.g. to type a single secondary language letter strike the #1 key and right after that the left key).

The single sign ('.') strike the RDI and then strike the #1 key (or use the method described above).

The second sign ('&'), strike the 'RDI' afterwards strike twice the #1 key.

To switch to a mode of typing a sequence of secondary-language (i.e. □ □ □ is a sequence of Greek letters): 'RDI' and afterwards the left (⇨) arrow key.

Figure 4A:
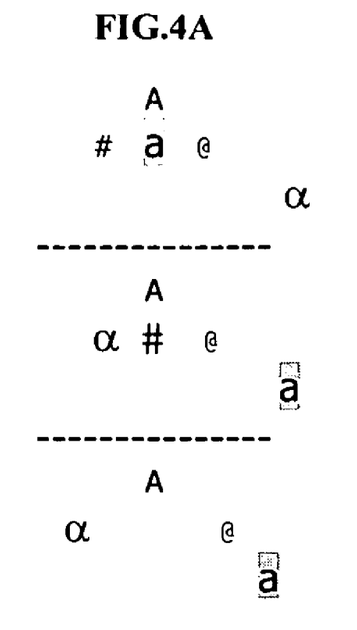
FIGS. 4A-4C show examples of on-screen mode display.
Figure 4B:
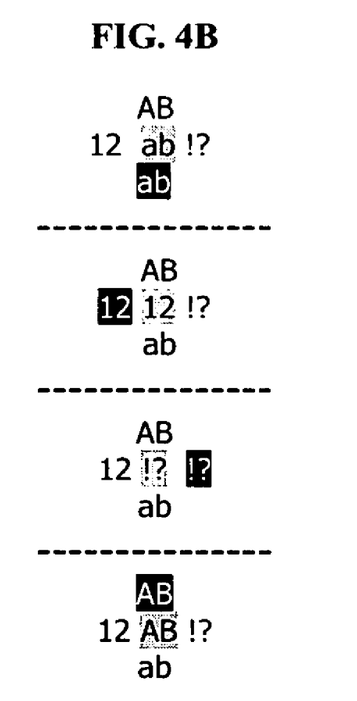
Figure 4C:
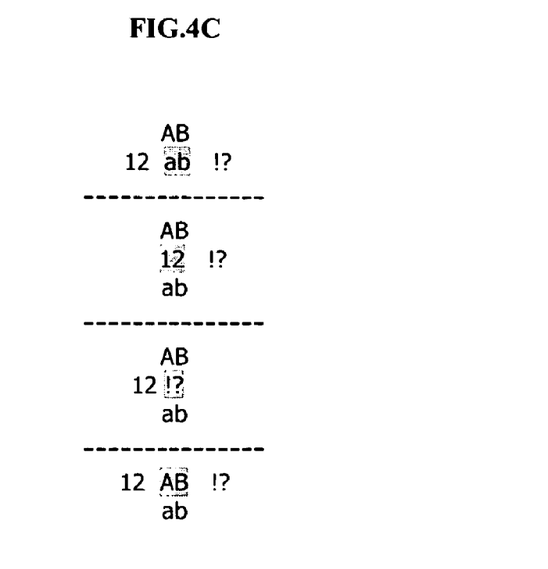

FIG. 4A-4C, show examples of some on-screen mode displays for use with devices that support second-language characters. Highlighted is the current temporary operating mode A, a, a, @, # represent accordingly the capital, lower case, secondary-language, sign and number modes. Highlights in different colors could be used to determine a current mode from a temporary current mode (e.g. grey highlight could be used to indicate a temporary mode that afterwards will change back to the lowercase mode). The LCD display can also display symbols of a label for the current character mode to provide visual confirmation to the user. FIG. 4A shows an optional on-screen bi-lingual display. FIG. 4B shows an optional on-screen uni-lingual display. FIG. 4C shows a T-shaped on-screen uni-lingual display.

In comparison to the current multi-keypress keypad method used such as for text messaging (SMS) which has an average key-strokes-per-data-entry ratio KPD=2.2, the above-described key assignment has a KPD=1.4. The English alphabet has 26 letters of which 24 letters are positioned in pairs on the keys of the standard 12-key keypad. The two most infrequent letters "Q" and "Z" are assigned singly in the second character mode of the "8" and "#" keys, and will be reachable either in the same manner as all the other ten most frequent signs (RDI→key) within two (and in some alternatives three) keystrokes or optionally by pressing the appropriate character key three times. These letters appear less frequently than 1.7 times in every 1000 letters written (appearance ratio of 0.00169 in standard English text). The following Table I shows the calculation comparing the expected KPD for this embodiment to the generic text (SMS) method. Other variations repositioning 'K' and 'V' or 'Q' and 'X' in the second character mode can reduce the KPD somewhat below 1.4.

Table II shows the calculation that repositioning the first 12 highly frequent letters 'E', 'T', 'A', 'O', 'I', etc., in the first keystroke location can decrease the average expected KPD below 1.2. However, the unfamiliar ordering may be difficult for users to learn. While keeping the alphabetical order is more crucial for easy adaptability, the invention is not limited to any particular alphabetic ordering and any other combination is possible.

The assignment of paired characters (in at least the first character mode) on each digit key also allows for reduction of time taken up with a "pause effect". In the standard multi-keypress method in which 26 English letters are assigned to nine digit keys, quick presses of a key in succession is required to cycle through the three or four letters assigned to that key in order to choose the desired letter. Pressing a new key selects a new character group on the new key. To select next letter on the same key as previously pressed, a long pause must be introduced to clear the previous selection and ready the coder to interpret the next press of the same key as a new letter. In the invention, 24 letters are assigned to 12 digit keys, so more letters can be selected upon pressing each new key that key, and the frequency of long pauses for same-key letter combinations is reduced. Table III shows the calculation of the reduction in pause effect by assigning two letters on each of 12 numeric keys as compared to the current multi-keypress method.

The key assignment method of the invention can be implemented to enable text/data entry almost universally in a broad range of device types since most use or include the 12-key numeric keypad. Such devices include: non-mobile phones, such as answering machines; PDAs; GPS devices; remote and other controllers; ATM machines; calculators; watches; games devices; mobile phones; media devices (e.g. the IPod™ player); cash registers; etc.

The invention can also be retrofitted to existing devices that have a programmable operating system and 12-key numeric keypad. The key re-assignment software can be downloaded from a PC, vendor computer, or online connection into the device through an available data port, or from a memory card inserted into a memory slot. The keypad keys can be relabeled with a new membrane overlay, a full panel exchange, key covers, or adhesive stickers, and the new key assignments can also be shown on the on-screen display. The following illustrates several examples of different installations.

The key assignment method described above may be used for many different devices and machines besides digital phones and mobile devices. Some of those devices do not have the RDI keys described above. Whenever the device does not include a "Central" RDI key, or whenever otherwise needed, the "Options" (top left menu key in FIG. 1) or other designated key may be used instead of the RDI in order to switch between modes. For example, this may be done by successive presses of the Options key cycles between the offered character modes, and/or pressing simultaneously two keys, and/or using long keystrokes of the arrow key or any other key, and/or pressing the 'Options' key and afterwards a selection key. If the device has 'Volume' keys, they can either remain in their current function and/or be used as 'Space' and 'Backspace' keys and/or navigation keys (thus optionally freeing the current keys that have those functions for other uses). Alternatively the 'Options' key followed by a stroke of a character key could provide a single entry of a certain mode (e.g. a single upper case letter).

Calculation of Comparative Speed of QWERTY, Invention, and Current Phone Keypad

As a measure of comparative speeds of using the standard QWERTY keyboard, the invention method, and current phone keypad, the following assumptions are made: input speed, one keystroke/sec; pause between successive letters on same key, 3 sec/pause (as in the Motorola 835 phone); input string, 100 letters; and KPD=1 for QWERTY and as calculated above for the invention system and current phone keypad. The results are calculated as follows:

QWERTY: (100 letters)×(1 $KPD$)=100 sec

Qtype's Method (keypad, alphabetical non-ordered): (100 letters)×(1.2 $KPD$)+(3 sec/pause)×(6.25 pauses per 100 letters)=133 sec Qtype's Method (keypad, alphabetical ordered): (100 letters)×(1.4 $KPD$)+(3 sec/pause)×(6.25 pauses per 100 letters)=153 sec Current Method: (100 letters)×(2.2 $KPD$)+(3 sec/pause)×(11.1 pauses per 100 letters)=253 sec The calculations show that using the invention method to write a sample of 100 letters of text would take about 50% more time than QWERTY (153−100=53 secs), while using the current phone keypad layout takes 150% more time (253−100=153 secs). When QWERTY is used as a baseline (i.e. the minimal time it takes to type in words), the invention system is about 3 times more efficient than current phone text entry systems. Taking into consideration the quicker mode change in alphanumeric mixed texts, the quicker entry of various signs, and the lower error rate of data entry (due to the decrease of letters per key), it is calculated that the invention method would take roughly half as much time to enter text than the current phone keypad layout.

Installing Keypad Assignment on Mobile Devices:

Mobile consumer electronic devices allow installation of various applications in several methods, depending on the various methods of connectivity allowed by the device. The most efficient way to install an application on any device is installing it together with the original installation of the operating system. This way the device will reach the client already preinstalled with the application along with its other preinstalled functions (e.g., Address Book, Messaging, etc). In this method, a host computer is not needed for installation, since the application is already embedded in the original firmware or software of the device.

Figure 3A:
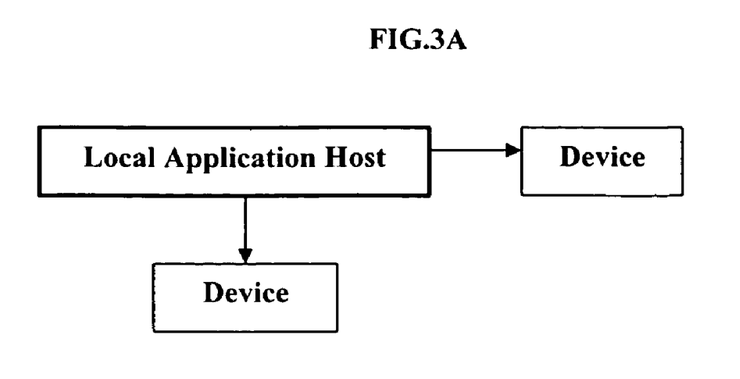
FIGS. 3A-3C show examples of installing and/or downloading the keypad assignment method at the OEM level, locally, and/or remotely.

To install the application locally or remotely, the installing personnel will use a host computer on their site connected to the device, as illustrated in FIG. 3A. The local installation can use a cable (serial, parallel, USB, Firewire, or any other physical cable connection), or wireless networking (WiFi, Bluetooth). Wireless networking is not dependent upon a physical cable connection to each device, and allows installation to more devices at once, and is only limited by the process power of the host computer.

Alternatively, an application SIM (or other memory card) may be used to install software components on the device. In this method, special application SIM cards are installed with the appropriate software embedded therein by the OEM. Once inserted to the device, the application SIM installs the new software on the device.

Figure 3B:
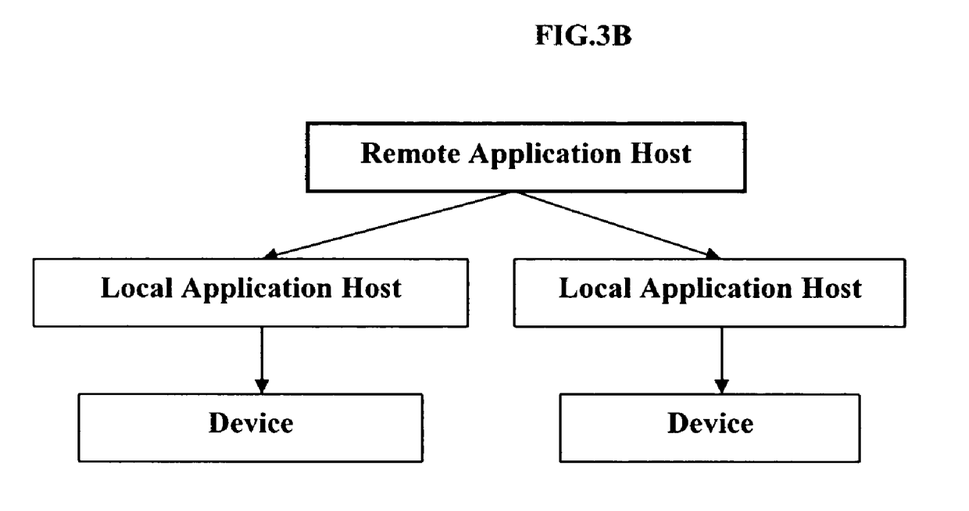

Using the internet, or any other network, the application may be installed remotely. As illustrated in FIG. 3B, the device can be connected to a host computer (Local Application Host) using any of the methods discussed above (cable, wireless connection) but the downloaded software may originate from a remote computer (Remote Application Host).

Figure 3C:
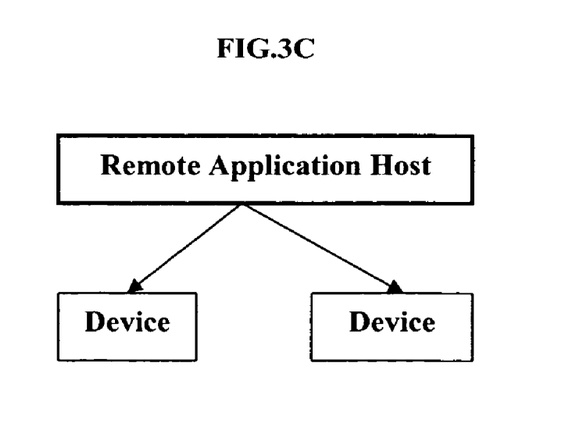

With internet-capable devices such as internet phones, the remote installation process may skip the local application host. As with JAVA applications today, the application can be downloaded to the mobile device through any existing connectivity (dial-up/GPRS/internet via Bluetooth/WIFI etc.) and independently accept a remote application, as illustrated in FIG. 3C.

Installing Keypad Assignment on Non-Mobile Devices:

Non-mobile devices can be either pre-installed at the OEM installation site or installed by downloading at their POS location (ATM machines, info kiosks etc). The same considerations discussed above are applicable for non-mobile installation, which again may be applied remotely or locally. Usually devices like ATM machines and information kiosks are not connected wirelessly but rather wired to a private physical network. Such devices typically use their existing network to receive downloads remotely from a remote application host. When the device itself is a fully operational computer, there may be no need for a local application host as described above.

Predictive Text Enhancement

Although not necessarily a part of the invention, predictive spelling methods may be used in combination with the key assignment method. Predictive spelling algorithms have ambiguity problems since there are often multiple words that could be represented by the same numeric keypresses. For example, the key string of "4,6,6,3" entered on a conventional multi-keypress keypad can correspond to word candidates "home", "gone" and "good". It requires users to use additional keystrokes to select the correct words during typing. The invention can be used in combination with predictive text systems (such as T9) and enhance their operation by decreasing the number of possible words corresponding to any keystroke combination. For example: the number of possible 3-letter words selectable from a conventional keypad layout (average of 3 letters per key) is 27, whereas in the invention method assigning 2 letters per key, the number of word candidates is 8. Moreover, the invention allows better solutions for nonstandard-word entries (such as e-mail addresses, stock symbols or slang terms), which can complement the utility of existing predictive text systems.

Other Enhancements

Other enhancements can be made to the keypad assignment method, including the following: keeping the alphabetic order but not necessarily always in pairs; not keeping alphabetic order, but improving ergonomics; not keeping alphabetic order, by ordering by frequency of use.

Figure 5:
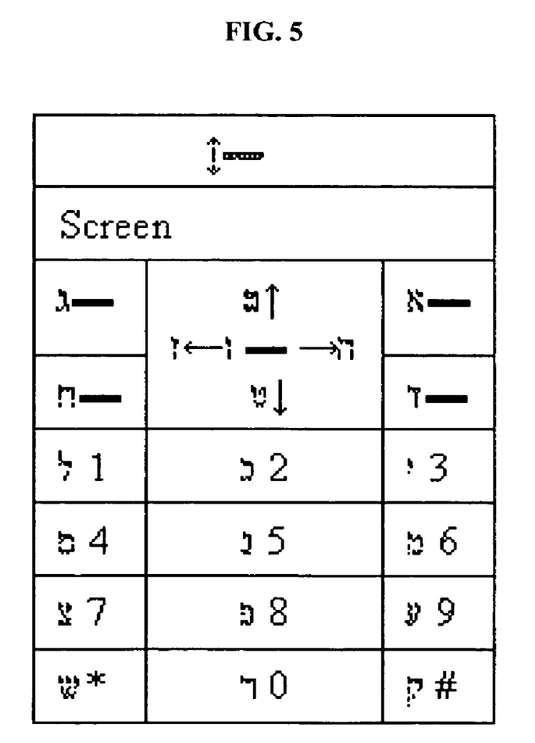
FIG. 5 shows an extended use of the function keys for characters, enabling a full alphabetic layout on a standard phone keyboard.

The method can also be retrofitted to devices that do not have a physical keypad, but rather display soft keys on the screen. The invention method can also be used on keypads with an expanded number of keys with the standard numeric keys, thereby multiplying the total number of characters that can be accommodated further, and/or with other mode selection options using other functional keys, such as the volume up/down keys or buttons as illustrated in FIG. 5. Another feature of the invention would be to simplify the use of secondary-language systems such as the Chinese phonetic data entry system.

Enabling users to call a phone number provided in text format of the old keyboard layout (solving the "1-800-shopping" problem) can be done either by using an on screen display of the old layout, or by enabling the user to type in the number as a combination of number and letters ('old SMS layout translator'). Alternatively, the user may be enabled to type a whole phone number as letters. In the future, in the same manner that companies use the 1-800-SHOPPING format, private people and small businesses may prefer to select their phone numbers using the above-described character layout. For example, if the user's name is "Dan Brad", the user could choose the number (212) 217-1912 that represents the letters of the name. For this reason, the character modes on the numeric keypad optionally allow people to enter and receive phone numbers in their alphabet format. This could be done by "Numbers to Letters Translator" software that will take as an input a phone number and will output its character format (and of-course the other way around). Optionally, if someone wants to place a call to the Dan Brad number, that user will only have to stroke the appropriate keys and on the screen will see the name appear.

Figure 6A:
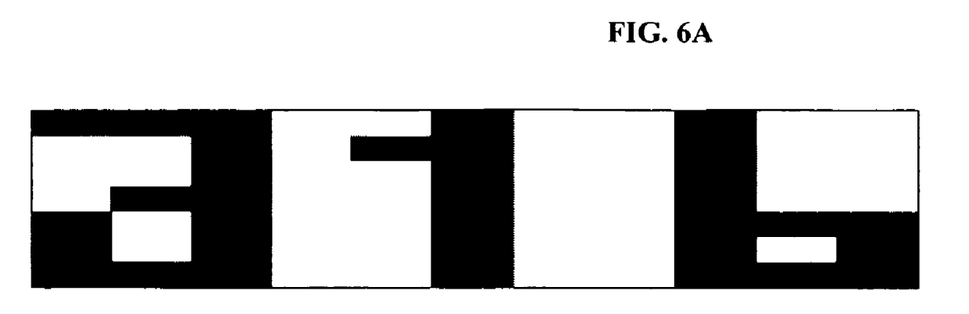
FIGS. 6A-6C show another way to display the letters of a current mode by using a special array of display keys.
Figure 6B:
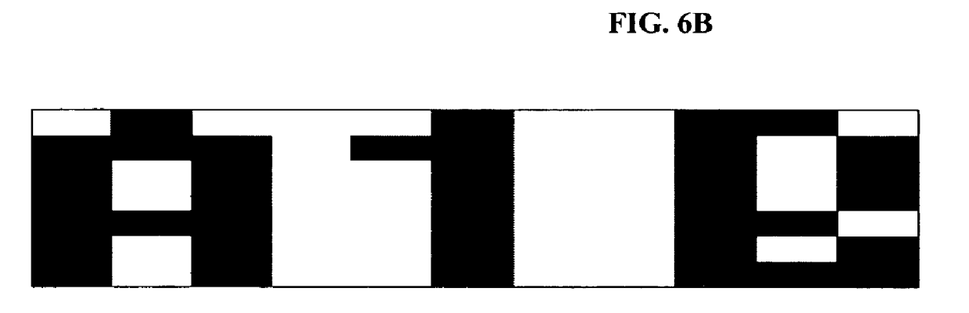
Figure 6C:
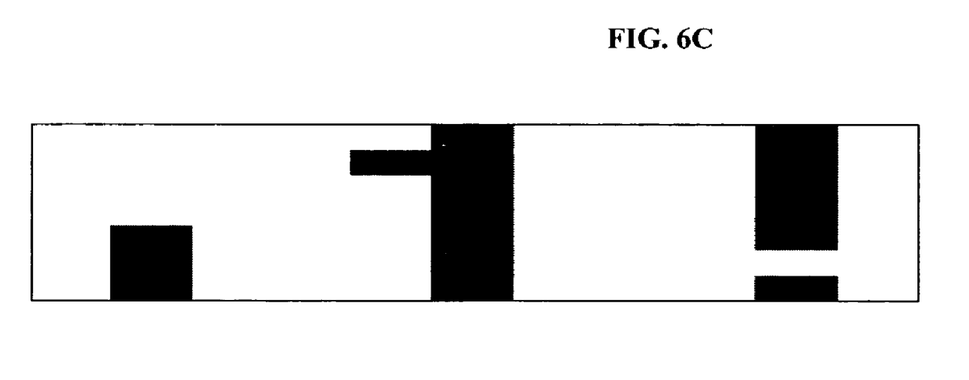

FIGS. 6A-6C show another optional way to display the letters of a current mode by using a special keyboard that will allow the display of both layouts on the keys. For example, the mobile device could be provided with keys that display the characters related to the user's currently selected mode (using special LED arrays or any other special display materials that could change their appearance). FIG. 6A shows when the current mode is lowercase English letters, the #1 key will display 'a 1 b'. FIG. 6B shows when the current mode is uppercase English letters, the #1 key will display 'A 1 B'. FIG. 6C shows when the current mode is signs, the #1 key will display '. 1 !'.

In summary, the keypad assignment method of the present invention provides a number of important advantages over present keypad systems and methods. It can provide an increase of the speed of data entry into a standard phone keypad by as much as 100%. An average KPD of as low as 1.2~1.4 keystrokes-per-data-entry ratio can be obtained, in comparison to 2.2 in the conventional keypad layout, thereby taking half the amount of time needed to enter data. It also reduces the "pause effect" caused when a sequential letter is located on the same key group. Text/data entry on mobile devices is enabled in a manner comparable to laptops and PCs. It eliminates the word ambiguity associated with predictive spelling systems, but can also be used in conjunction to enhance such systems. The character assignments are also more intuitive and easier to use than other conventional keypad or enhanced keypad systems, for example, by avoiding the need to remember shift-key functions for uppercase letters. As such, only minimal instructions and training needed. It enables fast and easy text entry (reaching any character within two keystrokes), lower error rate in typing, and also entering mixed alphanumeric and sign entries, thus improving entry of URL and email addresses, iconic symbols, and slang shorthand. As compared to predictive text methods, the invention has a much small memory requirement since there is no need for a large word dictionary.

The invention can also accommodate greatly expanded character sets within the same 12-key keypad, thus enabling other functions such as Select, Copy, Cut, Paste and Undo to be implemented, as well as multi-language character sets. It can be implemented as a software solution without hardware modifications to existing form factors, and can be retrofitted in existing devices through downloading of the application or reinstalling it by technical staff It can enable a broad range of existing mobile devices with keypads only to handle applications for text/data entry and the growing volume of text messaging users, thereby increasing the value of such devices and the revenues generated by their users for the associated networks.

It is understood that many modifications and variations may be devised given the above description of the principles of the invention. It is intended that all such modifications and variations be considered as within the spirit and scope of this invention, as defined in the following claims.

TABLE I letter frequency expectance with Qtype and generic SMS

| letter | letter freq % | P (letter) | SMS-X (clicks) | SMS XP | Qtype 1 clicks | Qtype XP | K and ∀ as second | Kvtype XP | QX as 2nd click | XP |
|---|---|---|---|---|---|---|---|---|---|---|
| a | 8.167 | 0.08167 | 1 | 0.08167 | 1 | 0.08167 | 1 | 0.08167 | 1 | 0.08167 |
| b | 1.492 | 0.01492 | 2 | 0.02984 | 2 | 0.02984 | 2 | 0.02984 | 2 | 0.02984 |
| c | 2.782 | 0.02782 | 3 | 0.08346 | 1 | 0.02782 | 1 | 0.02782 | 1 | 0.02782 |
| d | 4.253 | 0.04253 | 1 | 0.04253 | 2 | 0.08506 | 2 | 0.08506 | 2 | 0.08506 |
| e | 12.702 | 0.12702 | 2 | 0.25404 | 1 | 0.12702 | 1 | 0.12702 | 1 | 0.12702 |
| f | 2.228 | 0.02228 | 3 | 0.06684 | 2 | 0.04456 | 2 | 0.04456 | 2 | 0.04456 |
| g | 2.015 | 0.02015 | 1 | 0.02015 | 1 | 0.02015 | 1 | 0.02015 | 1 | 0.02015 |
| h | 6.094 | 0.06094 | 2 | 0.12188 | 2 | 0.12188 | 2 | 0.12188 | 2 | 0.12188 |
| i | 6.966 | 0.06966 | 3 | 0.20898 | 1 | 0.06966 | 1 | 0.06966 | 1 | 0.06966 |
| j | 0.153 | 0.00153 | 1 | 0.00153 | 2 | 0.00306 | 2 | 0.00306 | 2 | 0.00306 |
| k | 0.772 | 0.00772 | 2 | 0.01544 | 1 | 0.00772 | 2 | 0.01544 | 1 | 0.00772 |
| l | 4.025 | 0.04025 | 3 | 0.12075 | 2 | 0.0805 | 1 | 0.04025 | 2 | 0.0805 |
| m | 2.406 | 0.02406 | 1 | 0.02406 | 1 | 0.02406 | 2 | 0.04812 | 1 | 0.02406 |
| n | 6.749 | 0.06749 | 2 | 0.13498 | 2 | 0.13498 | 1 | 0.06749 | 2 | 0.13498 |
| o | 7.507 | 0.07507 | 3 | 0.22521 | 1 | 0.07507 | 2 | 0.15014 | 1 | 0.07507 |
| p | 1.929 | 0.01929 | 1 | 0.01929 | 2 | 0.03858 | 1 | 0.01929 | 2 | 0.03858 |
| q | 0.095 | 0.00095 | 2 | 0.0019 | 2 | 0.0019 | 2 | 0.0019 | 2 | 0.0019 |
| r | 5.987 | 0.05987 | 3 | 0.17961 | 1 | 0.05987 | 1 | 0.05987 | 1 | 0.05987 |
| s | 6.327 | 0.06327 | 4 | 0.25308 | 2 | 0.12654 | 2 | 0.12654 | 2 | 0.12654 |
| t | 9.056 | 0.09056 | 1 | 0.09056 | 1 | 0.09056 | 1 | 0.09056 | 1 | 0.09056 |
| u | 2.758 | 0.02758 | 2 | 0.05516 | 2 | 0.05516 | 2 | 0.05516 | 2 | 0.05516 |
| v | 0.978 | 0.00978 | 3 | 0.02934 | 1 | 0.00978 | 2 | 0.01956 | 1 | 0.00978 |
| w | 2.36 | 0.02360 | 1 | 0.0236 | 2 | 0.0472 | 1 | 0.0236 | 2 | 0.0472 |
| x | 0.15 | 0.00150 | 2 | 0.003 | 1 | 0.0015 | 2 | 0.003 | 2 | 0.003 |
| y | 1.974 | 0.01974 | 3 | 0.05922 | 2 | 0.03948 | 1 | 0.01974 | 1 | 0.01974 |
| z | 0.074 | 0.00074 | 4 | 0.00296 | 2 | 0.00148 | 2 | 0.00148 | 2 | 0.00148 | bolded letter - more than 6% frequency

|  |  |  |  |
|---|---|---|---|
| 2.14908 | 1.4051 | 1.35286 | 1.38686 |
| SMS E(x) = 2.15 cpl | Qtype(ZQ) E(x) = 1.41 cpl | Qtype(KV) E(x) = 1.35 cpl | Qtype(QX) E(x) = 1.39 cpl |
|  | ZQ total freq = 0.00169 (~1.7 from 1000) | KV total freq = 0.01750 (~1.8 from 100) | QZ total freq = 0.00245 (~2.5 from 1000) | infrequent | frequent

Qtype needs 65.4% of usual SMS — 65.4
cplSMS/cpl Qtype = 1.53
53% more clicks per text
(cpl SMS-cpl QWERTY)/(cplQtype-cpl QWERTY) = 2.84
SMS has 2.84 times more superfulous clicks (more than QWERTY) over Qtype > with QtypeKV the "unusual" clicks represent 1/50 letters clicked (cpl = 1.353)
> Qtype1 (QZ) has and unusual click frequency of 1.7 per 1000 letter and cpl = 1.405
> Qtype (QX) has unusual click frequency of 2.5 per 1000 with cpl 1.386
> which is better than qtype 1 by: 1.30 percent the difference are negligable in writing speed but in Qtype 1 letter arrangement it can be said that the 2 most unfrequent letters are located in a "unusual" click which is harder to perform and less similar to the SMS system

TABLE II letter according to use

| Letter | letter freq. % | Repositioning letters | xP |
|---|---|---|---|
| e | 12.702 | 1 | 0.12702 |
| t | 9.056 | 1 | 0.09056 |
| a | 8.167 | 1 | 0.08167 |
| o | 7.507 | 1 | 0.07507 |
| i | 6.966 | 1 | 0.06966 |
| n | 6.749 | 1 | 0.06749 |
| s | 6.327 | 1 | 0.06327 |
| h | 6.094 | 1 | 0.06094 |
| r | 5.987 | 1 | 0.05987 |
| d | 4.253 | 1 | 0.04253 |
| l | 4.025 | 1 | 0.04025 |
| c | 2.782 | 1 | 0.02782 |
| u | 2.758 | 2 | 0.05516 |
| m | 2.406 | 2 | 0.04812 |
| w | 2.36 | 2 | 0.0472 |
| f | 2.228 | 2 | 0.04456 |
| g | 2.015 | 2 | 0.0403 |
| y | 1.974 | 2 | 0.03948 |
| p | 1.929 | 2 | 0.03858 |
| b | 1.492 | 2 | 0.02984 |
| v | 0.978 | 2 | 0.01956 |
| k | 0.772 | 2 | 0.01544 |
| j | 0.153 | 2 | 0.00306 |
| x | 0.15 | x | 2 | 0.003 |
| q | 0.095 | 2 | 0.0019 |
| z | 0.074 | x | 2 | 0.00148 |

TABLE II-continued

| Letter | letter freq. % | Repositioning letters | xP | |
|---|---|---|---|---|
| freq(Q + Z) = | 0.169% | | 1.19383 | 0.156028 |
| | | if a frequent letter are always in the first click (1/41-1/19)/1.41 = 15.6% frequent letter first click save 15.6% cpl in comparison to normal Qtype layout | | |

TABLE III

Calculating the difference in 'the pause effect' caused by typing two consequative letters on the same key like hi' a word that needs a pause or a forward click in each letter

| Letter | freq (%) | freq (P) | clicks (SMS system | pause per key (SMS) | % | pause per key (Qtype-QZ) | % |
|---|---|---|---|---|---|---|---|
| a | 8.167 | 0.08167 | 1 | 0.007811 | 1 | 0.002437 | |
| b | 1.492 | 0.01492 | 2 | | 0.00505 | 2 | 0.00083 |
| c | 2.782 | 0.02782 | 3 | | 0.020238 | 1 | 0.002366 | |
| d | 4.253 | 0.04253 | 1 | 0.034494 | | 2 | | 0.010804 |
| e | 12.702 | 0.12702 | 2 | | 0.011677 | 1 | 0.021794 | |
| f | 2.228 | 0.02228 | 3 | | 0.006069 | 2 | | 0.000898 |
| g | 2.015 | 0.02015 | 1 | 0.013753 | | 1 | 0.002456 | |
| h | 6.094 | 0.06094 | 2 | | 0.00889 | 2 | | 0.00849 |
| i | 6.966 | 0.06966 | 3 | | 0.001312 | 1 | 0.000213 | |
| j | 0.153 | 0.00153 | 1 | 0.002388 | | 2 | | 2.36E−05 |
| k | 0.772 | 0.00772 | 2 | | 0.00293 | 1 | 0.002242 | |
| l | 4.025 | 0.04025 | 3 | | 0.010617 | 2 | | 0.001937 |
| m | 2.406 | 0.02406 | 1 | 0.022628 | | 1 | 0.003248 | |
| n | 6.749 | 0.06749 | 2 | | 0.015633 | 2 | | 0.010133 |
| o | 7.507 | 0.07507 | 3 | | 0.003075 | 1 | 0.008532 | |
| p | 1.929 | 0.01929 | 1 | 0.0166 | | 2 | | 3.67E−05 |
| q | 0.095 | 0.00095 | 2 | | 0.030285 | 2 | | 0.000114 |
| r | 5.987 | 0.05987 | 3 | | 0.041667 | 1 | 0.011579 | |
| s | 6.327 | 0.06327 | 4 | | 0.023493 | 2 | | 0.011459 |
| t | 9.056 | 0.09056 | 1 | 0.007306 | | 1 | 0.004995 | |
| u | 2.758 | 0.02758 | 2 | | 0.002303 | 2 | | 0.000539 |
| v | 0.978 | 0.00978 | 3 | | 0.000562 | 1 | 0.000462 | |
| w | 2.36 | 0.02360 | 1 | 0.001128 | | 2 | | 7.08E−05 |
| x | 0.15 | 0.00150 | 2 | | 9.07E−05 | 1 | 5.92E−05 | |
| y | 1.974 | 0.01974 | 3 | | 2.92E−05 | 2 | | 2.92E−05 |
| z | 0.074 | 0.00074 | 4 | | 0 | 2 | | 0 |
| red letters are letters that can come in doubles | | | | 0.106 10.6% of typed letters followed by a pause) pause per letter 9.4 1.757289 | | | 0.06 6% of qtyped letters followed by a pause 16.6 0.569059 reduction in 43% in pause effect from one pause in 9.4 letters, one pause in 16.6 | |

The caculation of pause per key as examplified by the DEF key in SMS system
1. only 'e' can appear after e
2. the frequency of pauses caused by this key is = P(D) × P(E + F) + P(E) × P(D + E + F) + P(F) × P(D + E)
3. The sums per all keys is summed up in 32F and 32I

The invention claimed is:

1. A method for assigning large sets of characters in different modes to the keys of a standard numeric keypad for text/data entry on a character-input device comprising:
   (a) associating each key of the numeric keypad with a first non-numeric character mode and one or more other, optional character modes, wherein the first character mode associated with the key includes a pair of characters of a standard alphabetic character set, and wherein the other, optional character modes associated with the key includes at least another non-numeric character;
   (b) providing a mode selection key with the numeric keypad for selecting between the first character mode and the other optional character modes; and
   (c) enabling text/data entry of alphabetic and other characters via the numeric keypad by interpreting a keypress of the mode selection key to select one of the character modes, and interpreting a keypress of a key of the numeric keypad in the first character mode as selecting the first character of the pair and two keypresses in succession as selecting the second character of the pair for that key,
   whereby the numeric keypad is enabled for text/data entry accommodating the alphabetic characters of a standard alphabetic character set as well as other characters with an average keypress-per-data-entry (KPD) ratio of less than 2.0.

2. A method for assigning keys on a keypad according to claim 1, wherein the standard numeric keypad has 12 keys, and the 26-letter English alphabet is assigned to the 12 keys in the first character mode in one of the following ways: 24 letters assigned in pairs to the 12 keys, except for two letters, and the two excepted letters assigned to two keys in a second, optional character mode; 26 letters assigned in pairs to the 12 keys with a $3^{rd}$ letter of 2 infrequently-used letters assigned to 2 keys.

3. A method for assigning keys on a keypad according to claim 1, wherein the standard numeric keypad has 12 keys, and the 26-letter English alphabet is assigned to the 12 keys in the first character mode in one of the following ways: two successive letters in alphabetic order, except for two infrequently-used letters, assigned to the keys in numerical sequence; two or more successive letters assigned to the numerical keys in QWERTY order; a frequently-used letter as the first character in a pair with an infrequently-used letter assigned to the keys in a mnemonic order.

4. A method for assigning keys on a keypad according to claim 2, wherein the average KPD is about 1.4 or lower.

5. A method for assigning keys on a keypad according to claim 1, wherein the mode selection key is another functional key provided with the keypad on the device.

6. A method for assigning keys on a keypad according to claim 1, wherein the mode selection key is comprised of 4-direction arrow keys (RDI keys) provided with the keypad on the device.

7. A method for assigning keys on a keypad according to claim 1, wherein characters corresponding to up to four character modes and one digit mode are graphically imprinted on the keys of the keypad to provide a visual cue for the user to select the corresponding modes.

8. A method for assigning keys on a keypad according to claim 1, wherein display indicators for the character modes are graphically mapped on a display screen of the device to provide a visual cue for the user to select the corresponding modes.

9. A method for assigning keys on a keypad according to claim 1, wherein display indicators for the character modes are changeably activated on key displays for the keys of the device to provide a visual cue for the user to select the corresponding modes.

10. A method for assigning keys on a keypad according to claim 1, wherein a plurality of other character modes are enabled, in order to accommodate large sets of other symbols and/or multi-language character sets.

11. A system for assigning large sets of characters to the keys of a standard numeric keypad for text/data entry on a character-input device comprising:
  (a) key associating means for associating each key with a first non-numeric character mode and one or more other optional character modes, wherein the first character mode associated with the key includes a pair of characters of a standard alphabetic character set, and wherein the other, optional character modes associated with the key includes at least another non-numeric character;
  (b) mode selection means for enabling a mode selection key provided with the numeric keypad for selecting between the first and the other optional character modes; and
  (c) software-driven means for enabling text/data entry of alphabetic and other characters via the numeric keypad, said software-driven means being operable to interpret a keypress of the mode selection key to select the first or the other optional character modes, and to interpret a keypress of a key of the numeric keypad in the first character mode as selecting the first alphabetic character of the assigned pair and two keypresses in succession as selecting the second alphabetic character of the assigned pair for that key,
  whereby the numeric keypad is enabled for text/data entry accommodating the alphabetic characters of a standard alphabetic character set as well as other characters with an average keypress-per-data-entry (KPD) ratio of less than 2.0.

12. A system for assigning keys on a keypad according to claim 11, wherein the standard numeric keypad has 12 keys, and the 26-letter English alphabet is assigned to the 12 keys in the first character mode in one of the following ways: 24 letters assigned in pairs to the 12 keys, except for two letters, and the two excepted letters assigned to two keys in a second, optional character mode; 26 letters assigned in pairs to the 12 keys with a $3^{rd}$ letter of 2 infrequently-used letters assigned to 2 keys.

13. A system for assigning keys on a keypad according to claim 11, wherein the standard numeric keypad has 12 keys, and the 26-letter English alphabet is assigned to the 12 keys in the first character mode in one of the following ways: two successive letters in alphabetic order, except for two infrequently-used letters, assigned to the keys in numerical sequence; two or more successive letters assigned to the numerical keys in QWERTY order; a frequently-used letter as the first character in a pair with an infrequently-used letter assigned to the keys in a mnemonic order.

14. A system for assigning keys on a keypad according to claim 12, wherein the average KPD is about 1.4 or lower.

15. A system for assigning keys on a keypad according to claim 11, wherein the mode selection key is another functional key provided with the keypad on the device.

16. A system for assigning keys on a keypad according to claim 11, wherein the mode selection key is comprised of 4-direction arrow keys (RDI keys) provided with the keypad on the device.

17. A system for assigning keys on a keypad according to claim 11, wherein characters corresponding to up to four character modes and one digit mode are graphically imprinted on the keys of the keypad to provide a visual cue for the user to select the corresponding modes.

18. A method for assigning keys on a keypad according to claim 11, wherein display indicators for the character modes are graphically mapped on a display screen of the device to provide a visual cue for the user to select the corresponding modes.

19. A system for assigning keys on a keypad according to claim 11, wherein display indicators for the character modes are changeably activated on key displays for the keys of the device to provide a visual cue for the user to select the corresponding modes.

20. A system for assigning keys on a keypad according to claim 11, wherein a plurality of other character modes are enabled, in order to accommodate large sets of other symbols and/or multi-language character sets.

* * * * *